(12) United States Patent
Caynak

(10) Patent No.: US 11,787,327 B2
(45) Date of Patent: Oct. 17, 2023

(54) MACHINE CONFIGURATION SYSTEM CAPABLE OF DIFFERENT WORKS BY MEANS OF VARIOUS COMPONENTS AND EQUIPMENTS

(71) Applicant: Moduler Makina Sanayi VE Ticaret Anonim Sirketi, Istanbul (TR)

(72) Inventor: Mansuri Caynak, Istanbul (TR)

(73) Assignee: Moduler Makina Sanayi Ve Ticaret, Istanbul (TR)

( * ) Notice: Subject to any disclaimer, the term of this patent is extended or adjusted under 35 U.S.C. 154(b) by 697 days.

(21) Appl. No.: 16/618,462

(22) PCT Filed: May 28, 2018

(86) PCT No.: PCT/TR2018/050266
§ 371 (c)(1),
(2) Date: Dec. 2, 2019

(87) PCT Pub. No.: WO2019/040028
PCT Pub. Date: Feb. 28, 2019

(65) Prior Publication Data
US 2021/0094459 A1     Apr. 1, 2021

(30) Foreign Application Priority Data

Jun. 2, 2017  (TR) .................................. 2017/08183

(51) Int. Cl.
*B60P 3/42*     (2006.01)
*B62D 49/06*    (2006.01)
(Continued)

(52) U.S. Cl.
CPC ................. *B60P 3/42* (2013.01); *B60K 1/00* (2013.01); *B60K 11/02* (2013.01); *B60K 17/10* (2013.01);
(Continued)

(58) Field of Classification Search
CPC ... B60P 3/42; B60L 50/40; B60K 1/00; B60K 11/02; B60K 17/10; B60K 17/356;
(Continued)

(56) References Cited

U.S. PATENT DOCUMENTS 3,734,223 A     5/1973  Anderson
6,484,830 B1 *  11/2002 Gruenwald .............. B60K 6/54
                                                         903/917
(Continued)

FOREIGN PATENT DOCUMENTS

FR     2276429 A1    1/1976
FR     2568236 A1    1/1986
(Continued)

*Primary Examiner* — Bryan A Evans
(74) *Attorney, Agent, or Firm* — GableGotwals

(57) ABSTRACT

The present invention relates to a machine configuration system (100) which can realize the different works, realized by work machines, industrial machines, agricultural machines, military vehicles, remotely-controlled, autonomous, etc. machines, by means of components and equipments having capability of fixation to various locations of the main chassis (1) and main chassis (1) with track (2a) or single type, four-wheel drive and platform with rotation through four wheels (2).

21 Claims, 11 Drawing Sheets

(51) Int. Cl.
*B60L 50/40* (2019.01)
*B60K 1/00* (2006.01)
*B60K 11/02* (2006.01)
*B60K 17/10* (2006.01)
*B60R 16/023* (2006.01)
*B60R 16/03* (2006.01)
*B62D 21/00* (2006.01)
*E02F 3/96* (2006.01)
*B60K 17/356* (2006.01)

(52) U.S. Cl.
CPC ............ *B60K 17/356* (2013.01); *B60L 50/40* (2019.02); *B60R 16/0231* (2013.01); *B60R 16/03* (2013.01); *B62D 21/00* (2013.01); *B62D 49/06* (2013.01); *E02F 3/964* (2013.01); *B60K 2001/001* (2013.01)

(58) Field of Classification Search
CPC .......... B60K 2001/001; B60R 16/0231; B60R 16/03; B62D 21/00; B62D 49/06; E02F 3/964

See application file for complete search history.

(56) References Cited

U.S. PATENT DOCUMENTS

| | | | |
|---|---|---|---|
| 8,474,161 B2* | 7/2013 | Cunningham | B66C 23/18 37/403 |
| 2002/0175007 A1* | 11/2002 | Strong | E02F 9/0841 180/54.1 |
| 2008/0093140 A1* | 4/2008 | Asai | H01M 8/248 429/513 |
| 2012/0181100 A1* | 7/2012 | Halliday | B60K 11/08 89/930 |

FOREIGN PATENT DOCUMENTS

| | | |
|---|---|---|
| JP | 2007205100 A | 8/2007 |
| WO | 2014039041 A1 | 3/2014 |

* cited by examiner

MACHINE CONFIGURATION SYSTEM CAPABLE OF DIFFERENT WORKS BY MEANS OF VARIOUS COMPONENTS AND EQUIPMENTS

CROSS-REFERENCE TO RELATED APPLICATIONS

This United States application is the National Phase of PCT Application No. PCT/TR2018/050266 filed 28 May 2018 which claims priority to Turkish Patent Application No. 2017/08183 filed 2 Jun. 2017, each of which is incorporated herein by reference.

TECHNICAL FIELD

The present invention relates to a system which forms machine configurations which can realize the different works, realized by work machines, industrial machines, agricultural machines, military vehicles, remotely-controlled, autonomous, etc. machines, by means of components and equipments having capability of fixation to various locations of the platform and platform with track (main chassis) or single type, four-wheel drive and platform with rotation through four wheels (4 wheel steering).

KNOWN STATE OF THE ART

Today, there are diggers-loaders, terrain handling machines (telehandler), flexible loaders, personnel platforms, terrain trucks, tractors and military vehicles, where each type has a unique design and production method. The mutual characteristics of these machines are that they can be towed through four wheels and they accommodate diesel engines and power transmission components, equipments which perform the work and hydraulic units which control the equipments. Mostly, the used components are the same and the locations and equipments of the components are different.

A purchased machine can only realize the work which relates to the equipment where said machine is made. For instance, only loading processes are realized by means of the flexible wheeled loader, agricultural works are realized by means of agricultural tractor by only fixing agricultural attachments, general-purpose constructional works are realized by means of digger-loader and telehandler, excavation works are realized by the terrain truck and military-purpose works are realized by means of military vehicles. For different works, machines where different equipments are fixed are purchased.

All of these lead to formation of inactive machines and moreover, they lead to difficulties like time loss and stock cost for production of the desired machine type and for waiting of the distribution thereof.

The application with number FR2276429 A1 obtained as a result of technical researches relates to units placed to the gaps formed by means of chassis and profiles formed by joining two profiles which are in inverse T form. Thanks to this embodiment, it has been mentioned that various machines can be formed for realizing works. However, a chassis with the required resistance for an ordinary work machine cannot be provided by means of said embodiment.

Because of the 2 gaps formed on the chassis, double embodiments can be used for the units. At one of the delimited front and rear sections, the engine compartment and the seating section (the section where both are provided is named as the "engine module") are provided and the attachment is connected to the other section. As can be understood, as a different embodiment, a completely opposite embodiment can be formed.

In the section named as engine module, there shall be control unit, engine, hydraulic units (pump, valve, etc.) and an operator section. This design can be considered as pushing and fixing of the engine hood and operator section of the work machines in the present art towards the front side or rear side of the chassis on the rail in an adherent manner.

For the unit which will realize the work, after the engine module is fixed to the front or to the rear in the inverse T-formed chassis, if the engine section is fixed to the rear, the arms, hydraulic cylinders and attachments (bucket, earth digger, forklift, etc.) are assembled separately for creating equipment to the holes in orthogonal and horizontal position existing on the inverse T chassis at the front side.

Because of the chassis structure, heavy service type axles could not be placed to the machine. Four independent wheels are directly connected to the chassis and two wheels are applied between the hydraulic engine, chassis and wheel connection for providing towing. In this case, first of all, the wheels connected to the chassis cannot realize steering (cannot rotate to the right-left) and the movement and the orientation of the formed machine are indefinite. Therefore, the embodiment mentioned in the application with number FR2276429A1, which is not considered to be suitable for mass production, is not applicable to industry.

However, said structure does not have a novelty which aims to bring a solution to the abovementioned disadvantages. The mechanisms, developed on usage of the attachments by means of changing, have been designed at a limited area and to be used only for specific attachments. For instance, for realizing loader equipment, the arms, the hydraulic cylinders and the bucket are connected separately and the loader equipment is formed by means of joining to the chassis. In the modular machine, the ready loader equipment, where the assembly tests have been made, is fixed to the desired section of the main chassis by means of quick connections. Thanks to this, both the fixation duration and the failure risk are eliminated.

As a result, because of all of the abovementioned problems and since the present solutions are insufficient, an improvement is required in the related technical field.

OBJECT OF THE INVENTION

The present invention is formed in the light of the present conditions and aims to eliminate the above mentioned disadvantages.

The main object of the present invention is to provide a machine configuration system which provides formation of modular machines/tools in order to realize different works by means of various fixable/removable components and equipments.

Another object of the present invention is to create a system which forms machine configurations which can realize different works, which are realized by work machines, industrial machines, agricultural machines, military vehicles, remote-control, autonomous, etc. machines, by means of the platform which can rotate through four wheels and by means of components and equipments which are fixable to different locations of the platform.

Equipments and components, which will realize the work, are placed on a platform, which can be towed through four wheels and which can be rotated, depending on the type of the work. By means of this, machine/tool having the desired characteristics is obtained.

Machine/tool becomes working within a few hours by means of placing and interconnecting the components and equipment to a platform, where the terrain type axles, which are driven by 4×4 electric engines are connected, and by means of automatically adjusting the control unit.

Modular components are generator, battery, ultra-capacitor, cooling unit, hydraulic unit and operator cabinet. Equipments are various units produced in a standard manner and where only the chassis connection locations are made particularly. The units like loader, digger, tractor lift, robot arm, forklift mast, dozer, etc. can be mentioned as examples. Equipments are hydraulically or electrically driven and they are controlled by the machine control unit (MCU) where the electronic command arms, existing in the operator cabinet, are connected.

Machine installation is as follows; equipments and components are placed and fixed on the platform. Power electric and control signal cables, hydraulic hoses and cooling hoses are fixed. After the assembly is realized, by means of a single button, the attachment setting which is set for efficient operation in the desired machine characteristic is selected. The system formed in this manner is now a machine, loader, tractor or construction robot.

The main items of a work machine already produced is the attachment which will realize the work and power transmission units (engine-transmission box) and hydraulic group which provide movements of the machine and the operator cabinet positioned with respect to said attachment and where views and controls are provided.

All of the items are positioned with respect to the equipments (attachment) to be fixed. To view the equipments in a firm manner determines the cabinet position and to create advantageous rear weight determines the engine position and transmission box and hydraulic unit positions.

The performance of a machine is determined by the load lifted by the attachment and in other words, it is determined by the tipping load. Machine components are placed in a manner forming the best rear weight with respect to the position of the attachment.

An elastic wheeled loader comprises loader attachment at the front and cabinet in the middle and engine and hydraulics at the rear which will form rear weight and which will increase the overturning load of the machine. A tractor comprises hydraulic lifter at the rear where the attachment will be connected and engine at the front which will create weight and other components. A remote-intervention robot comprises a remote-control robot arm in the middle and batteries, engine and hydraulic drive systems. A digger-loader is formed by balanced placement of attachments at the front and at the rear and placement of cabinet and other systems in the middle.

In the light of this reasoning, modular units are also placed in this manner. Since the machine is modular, the machine can be rapidly formed at the desired location instead of factory.

Another object of the present invention is to eliminate the difficulties like stock cost and time loss like waiting for the production and distribution of the desired machine type and eliminate the formation of inactive machine by means of fixing different equipment to a machine.

In the known state of the art, the novelty and technical advantages of the present invention against said document;
A complete platform has been formed which is reinforced by means of profiles seated onto the terrain type axles.
The ready modules are connected to the chassis by means of quick connections and various and functional machines can be formed in a rapid and practical manner.

Since the number and types of modules, which can be assembled onto the chassis, are great, the number of machines having different characteristics which can be formed and the number of possible configurations are very great.

Engine (generator section), cabinet (operator cabinet), hydraulic module (hydraulic pump and unit where valves are provided) are completely separate modules and they have the freedom to be placed at any location of the main chassis.

Thanks to the two heavy duty type 4×4 axles and thanks to the hinges which realize wheel connections to the axles, the machine has steering and towing capability through the four wheels.

The structural and characteristics features of the invention and all advantages will be understood better in detailed descriptions with the figures given below and with reference to the figures, and therefore, the assessment should be made taking into account said figures and detailed explanations.

BRIEF DESCRIPTION OF THE FIGURES

The drawings are not to scale and the details which are not necessary for understanding the present invention may be omitted. Moreover, the elements which are at least substantially identical or which have at least substantially the same functions are shown with the same number.

REFERENCE NUMBERS

Figure 1:
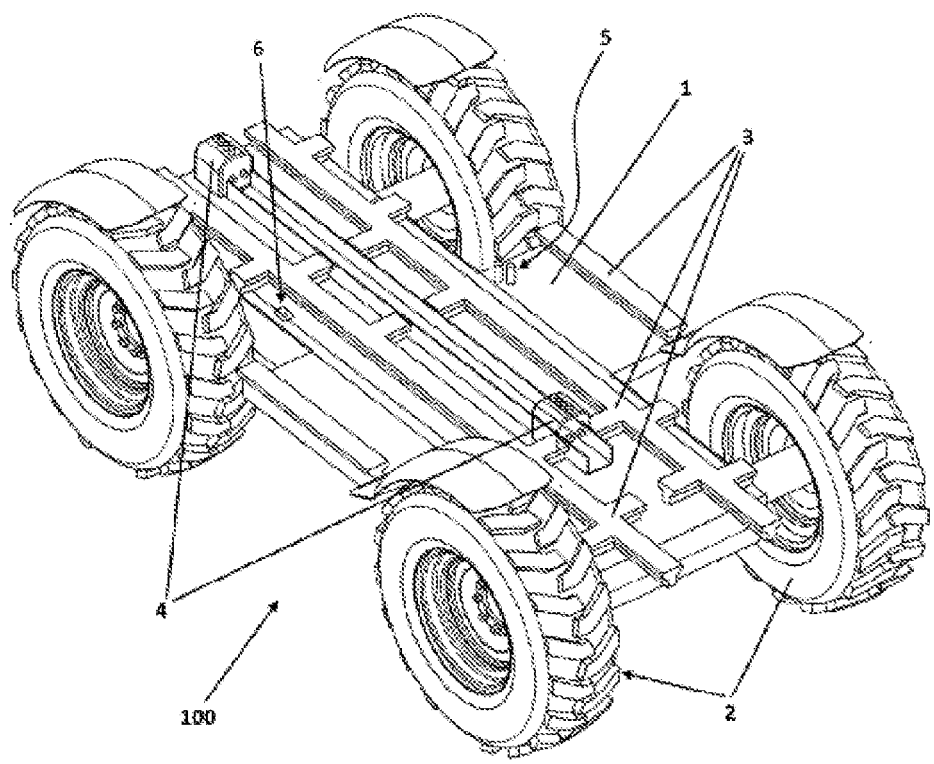
FIG. 1 is the view of the main chassis of the subject matter machine configuration system.

100. Machine configuration system
1. Main Chassis
2. Wheel
3. Connection Profiles
4. Hydraulic Quick Connections
5. Cooling Liquid Connections 6. Cabling Passage Location
7. Steering Axles
8. Electric Engine
9. Control unit (MCU)
10. Electrical Cables
11. Generator
12. Cooling Module
13. Hydraulic Module
14. Operator Cabinet
15. Ultra-Capacitor
16. Battery
17. Hydraulic Lifter
18. Robot Arm
19. Loader
20. Digger

DETAILED DESCRIPTION OF THE INVENTION

In this detailed description, the preferred embodiments of the present invention are explained with references to examples without forming any restrictive effect only in order to make the subject more understandable.

The present invention relates to machine configuration system (100) which can realize the different works, realized by work machines, industrial machines, agricultural machines, military vehicles, remotely-controlled, autonomous, etc. machines, by means of components and equipments having capability of fixation to various locations of the main chassis (1) and main chassis (1) with track (2a) or single type, four-wheel drive and platform with rotation through four wheels (2). By means of this, machine/tool is obtained having the desired characteristics.

The modular components are generator (11), battery (16), ultra-capacitor (15), cooling module (12), hydraulic module (13) and operator cabinet (14). The modular equipments are various units produced in a standard manner and where connections are realized only to the main chassis (1). As an example to these, units like hydraulic lifter (17) (tractor lift), loader (19), digger (20), robot arm (18), forklift mast, dozer, etc. can be given as an example. The equipments are driven hydraulically or electrically and they are controlled by the machine control unit (9) where the electronic control arms, provided in the operator cabinet (14), are connected. The machine control unit (9) can also be directly controlled by means of remote control.

The operator cabinet (14), where the operator seats and where the operator controls the machine configuration system (100), is fixed to the connection profiles (3) of the main chassis (1) with the help of connection elements provided at the lower corners thereof. Afterwards, electrical cables (10) are connected for control electric. The operator cabinet (14) is connected to the main chassis (1) by means of electrical cables (10) only for communicating with the control unit (9). When remote control of the machine configuration system (100) is needed, it is separated from the main chassis (1) and it is put to a fixed area. It communicates with the control unit (9) in a remote-controlled manner. Thus, particularly in dangerous works, remote control of the control unit (9) with a control element and the machine configuration system (100) can be managed by wireless signals without needing operator cabinet (14) and/or without needing presence of a person on the vehicle.

In FIG. 1, the main chassis (1) of the machine configuration system (100) is illustrated. The main chassis (1) is the section, whereon the components/equipments which provide operation of the machine configuration system (100) and the equipments which operate automatically and which will realize the work and which are towed through four wheels (2) (4×4) and which are rotated through four wheels (2) (steering) or with track (2a), can be placed/fixed in a variable manner. The main chassis (1) is moreover the platform which accommodates the connection profiles (3) which provide fixation of equipments and components to the desired location in an easy manner and placed horizontally and orthogonally and providing the required flexibility for the modular structure at the upper section thereof. Said wheels (2) or tracks (2a) may be driven by the electric engine (8) or by hydraulic engine.

In usage of hydraulic engine, hydraulic pump will be used instead of alternator connected to the internal combustion engine. Since the hydraulic pump will provide hydraulic both to the wheels (2) and to the attachments, there will remain no need for a hydraulic module (13), there will only be the section where the hydraulic valves exist instead of the hydraulic module (13).

Figure 11:
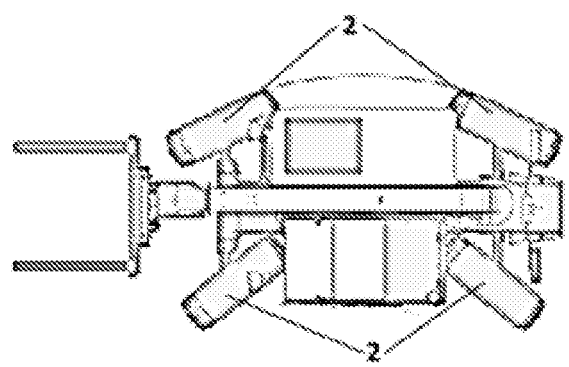
FIG. 11 is the top view where the steering wheels in the subject matter machine configuration system are illustrated.
Figure 12:
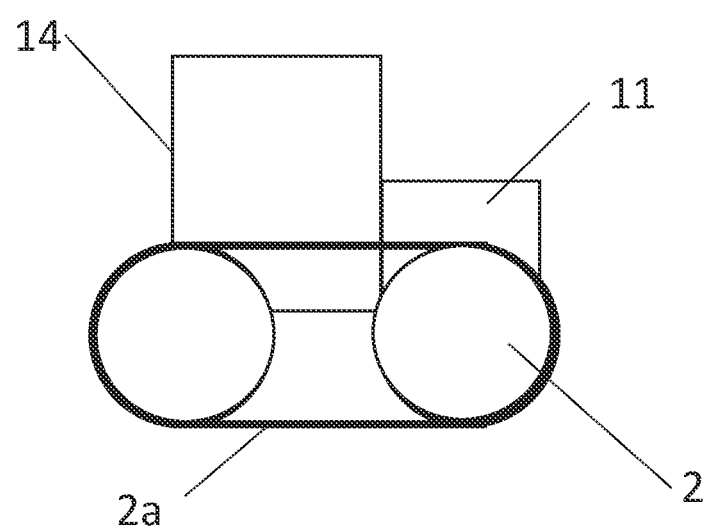
FIG. 12 is a view of the machine configuration system shown with tracks.

In the preferred wheeled (2) embodiment, the wheels (2) provide movement of the machine configuration system (100) and provide the towing power for realizing work and provide contact with the floor; there are four driven wheels (2) and they are with steering. (FIG. 11)

The hydraulic quick connections (4) are provided in front of and behind the main chassis (1) and they are connected to each other by means of pipes. Thus, said hydraulic quick connections (4) are used instead of hose connections in transferring the hydraulic fluid, exiting the hydraulic module (13), to the components and equipments provided at the front and rear section in a practical and simple manner (without needing use of long hoses).

The cooling liquid connections (5) are the input-output connections which provide transmission of the liquid, providing cooling of the electric engines (8), to the cooling module (12) which is to be fixed onto the main chassis (1). The cooling liquid connections (5) and hoses provide flow of said cooling liquid between the cooling module (12) and the components/equipments.

The cabling passage locations (6) are the gaps/sections which provide entry of the electrical cables (10) of the electric engines (8) and of the control unit (9) to the main chassis (1). These electrical cables (10) which transmit power and control signals to the equipment and components exit from here to the upper section of the main chassis (1).

Figure 2:
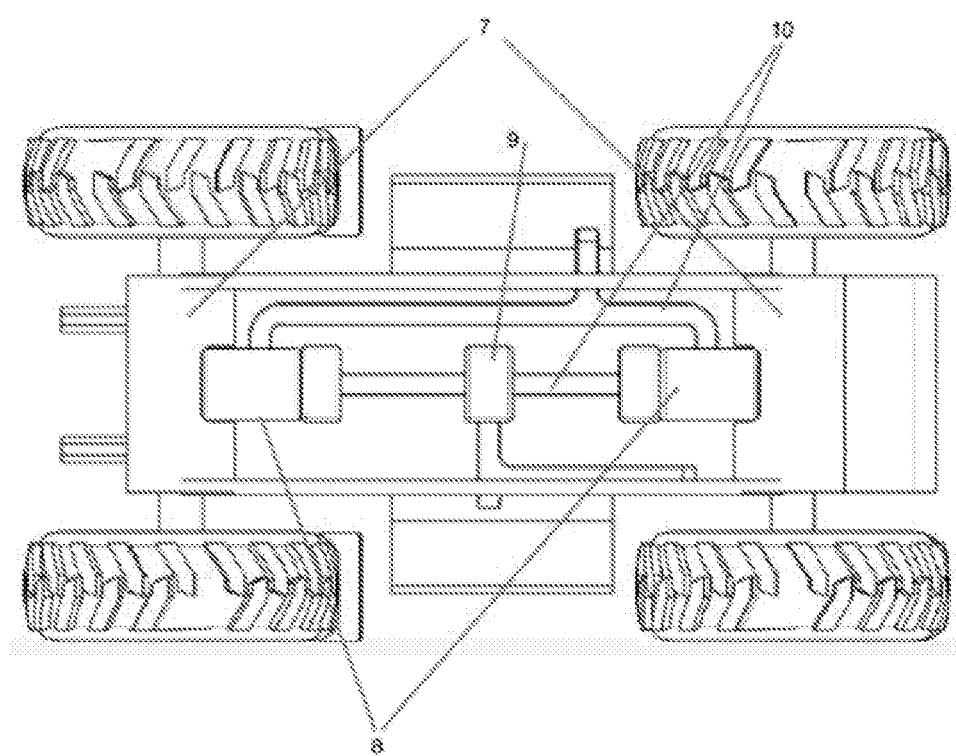
FIG. 2 is the bottom view of the main chassis of the subject matter machine configuration system.

In FIG. 2, the lower view of the main chassis (1) of the machine configuration system (100) is given. Here, the terrain type steering axles (7) and the electric engines (8) connected directly to said terrain type steering axles (7) can be seen. The electric engines (8) and the steering unit which provides turning are integrated to the heavy duty type steering axles (7) which provide towing of the vehicle and which provide direction determination. The electric engines (8) provide the best and desired towing to the vehicle in all terrain conditions together with the inverters thereof coupled to the steering axles (7).

The control unit (9), boxed for providing protection against the external factors and provided in the middle section, is the electronic unit where all control software of the machine configuration system (100) is provided and where the mode and type of the machine configuration system (100) which will be obtained at the end of the configuration are selected and where characteristic adjustments are realized which provide control and co-operation of the components and equipments of the machine configuration system (100).

In the most general form, the machine configuration system (100) is installed as follows: On the main chassis (1), said modular equipment and components are placed and fixed. Cooler and hydraulic connections are realized together with the electrical cables (10) which will carry the control signals and power electric. After assembly is realized, by means of a single button, attachment adjustment, having the desired machine characteristic, is set through the control unit (9).

Figure 3:
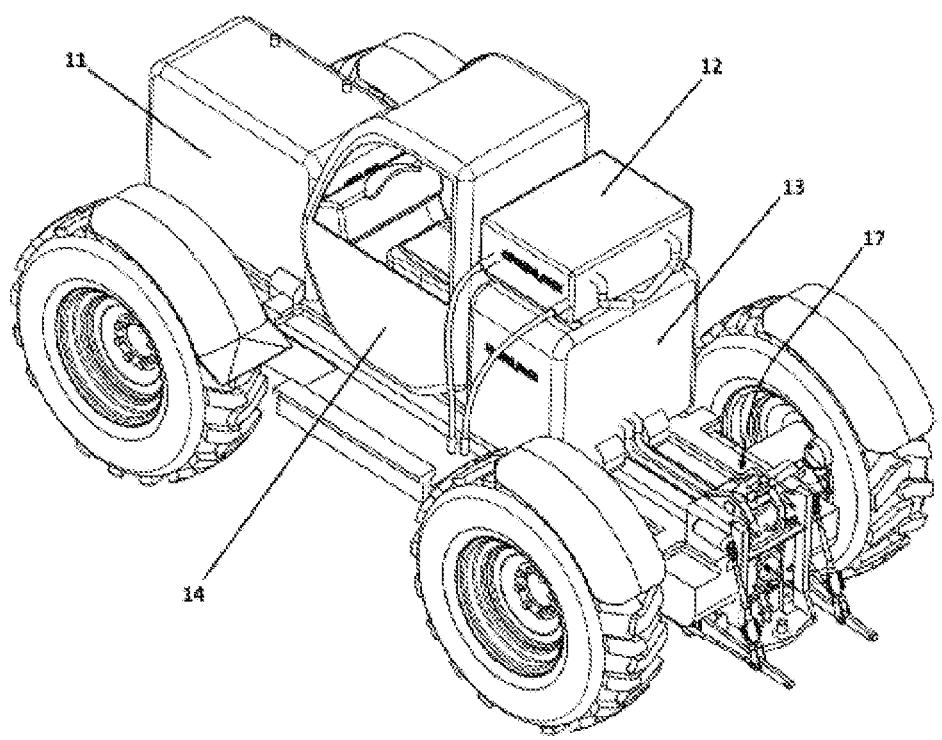
FIG. 3 is the view where the subject matter machine configuration system is applied as agricultural tractor.

In FIG. 3, the machine configuration system (100) applied as agriculture tractor is illustrated. First of all, the hydraulic lifter (17) which is the equipment which will realize the work (which will tow plows) is easily placed and fixed to the rear side of the main chassis (1) by means of connection profiles (3). The hydraulic lifter (17) is the standard equipment existing in standard tractors and where the agricultural attachments are fixed and which provide realization of work by towing. After the hydraulic module (13) is placed, the hydraulic quick connections (4) are fixed which provide connection to the hydraulic lifter (17). The movements of the hydraulic lifter (17) are provided by means of controlled oil flow coming from the hydraulic module (13).

Generator (11) or a similar power unit, which generates the power electric needed by the machine configuration system (100) and where the alternator is driven by means of internal combustion, turbine and similar types of engines, is fixed to the connection profiles (3), provided at the front side of the main chassis (1), with the help of connection elements provided at the lower corners thereof. Electrical transmission to the main chassis (1) is provided by means of connecting electrical cables (10).

The operator cabinet (14), where the operator seats and controlled by the machine configuration system (100), is fixed to the side of the generator (11) at a suitable position which will provide rear view and to the connection profiles (3) of the main chassis (1) with the help of connection elements provided at the lower corners thereof. Afterwards, electrical cables (10) are connected for control electric.

The hydraulic module (13), driven by the electric engine and comprising hydraulic pumps and valves and which provides movement to the equipments and to the attachments, is placed to the rear of the operator cabinet (14). Control of electric engine and solenoid valves is provided by the control unit (9). It is fixed to the connection profiles (3) in the main chassis (1) by means of connection elements provided at the lower corners. Afterwards, electrical cables (10) are connected for the power electric and control signal. For hydraulic power transmission, hose and hydraulic quick connections are fixed to the hydraulic lifter (17) through the hydraulic module (13).

On said hydraulic module (13), the cooling module (12) is placed which comprises the cooling liquid radiator of the electric engines (8), the internal combustion engine cooling radiator of the generator (11) and oil cooling radiator groups of the hydraulic module (13) and having electrically driven fan and which provides cooling of the heated components with the help of fluid. The connection elements (profiles which engage to each other), provided at the lower corners, are fixed to the connection profiles (3) provided on the main chassis (1). Afterwards, for power electric and for the control signal, they are fixed by using electrical cables (10) and cooling liquid connections (5) to the units to be cooled.

By means of the monitor and command buttons provided in the operator cabinet (14), the control unit (9) is brought to pre-adjusted tractor mode. Thanks to the identification chip provided on the hydraulic lifter (17) fixed as equipment, the operation flow rate and pressure values of the hydraulic module (13) are automatically adjusted. The machine configuration system (100) is made ready for use as tractor.

Figure 4:
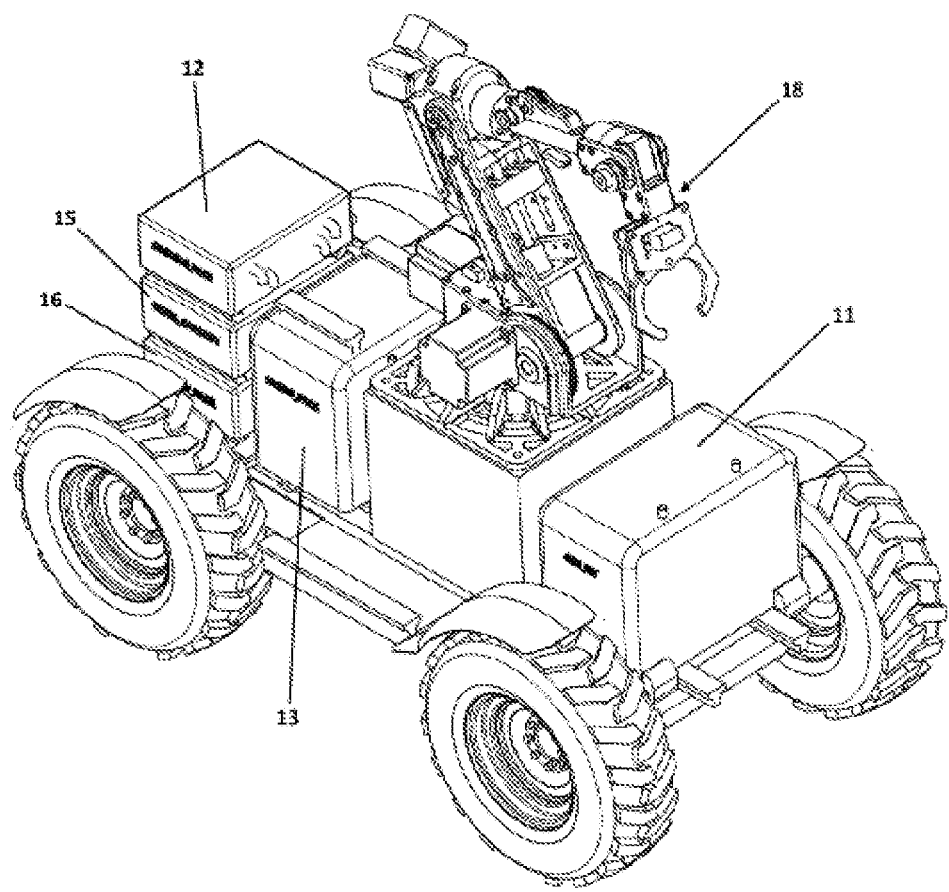
FIG. 4 is the view showing the subject matter machine configuration system as a machine which can work autonomously and in a remotely controlled manner or remote intervention device or construction robot.

In FIG. 4, a machine is illustrated which can operate as construction robot or remote intervention vehicle or remote-control and autonomously. In this configuration, the robot arm (18), which can operate hydraulically or electrically and which is the main section which realizes the work, is fixed to the middle of the platform and the generator (11), the hydraulic module (13) and the battery (16) are fixed to the remaining sections by means of connection profiles (3). The battery (16) is the modular box where chargeable high power accumulators, where electrical energy is stored, are grouped. It is fixed to the connection profiles (13) in the main chassis (1) by means of connection elements provided at the lower corners thereof. Afterwards, the electrical cables (10) are connected for the power electric and control signal.

On said battery (16), the ultra-capacitor (15) and the cooling module (12), activated in case of need for rapid acceleration and rapid power, are fixed to the connection profiles (3) in the main chassis (1) by means of connection elements provided at the lower corners thereof. Hydraulic quick connections (4) are provided from the hydraulic module (13) to the robot arm (18). Electrical cables (10) are connected for providing power electric and control signal to all components. The control unit (9) is coded for robotic operation by means of remote control. The system is now ready for remote-intervention. If usage is desired as construction robot, concrete shaping process by means of brick laying or by means of concrete flattening attachments to be fixed to the arm end can be realized easily by loading autonomous software to the control unit (9).

Figure 5:
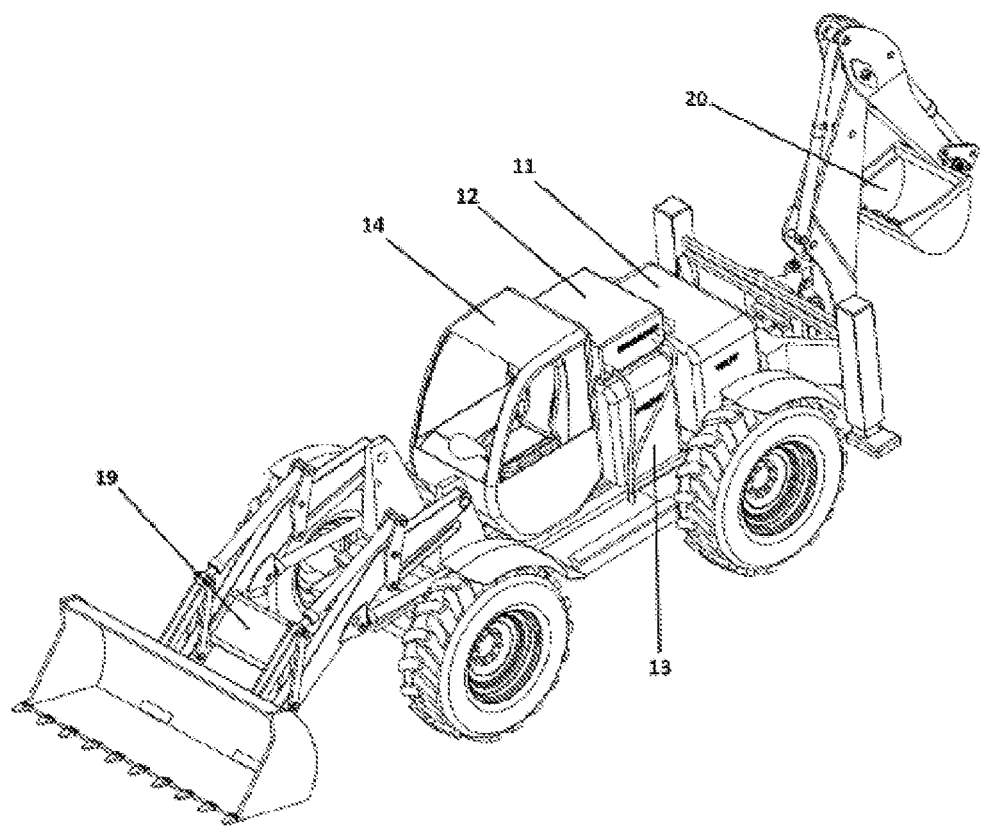
FIG. 5 is the view where the subject matter machine configuration system is applied as digger-loader.
Figure 6:
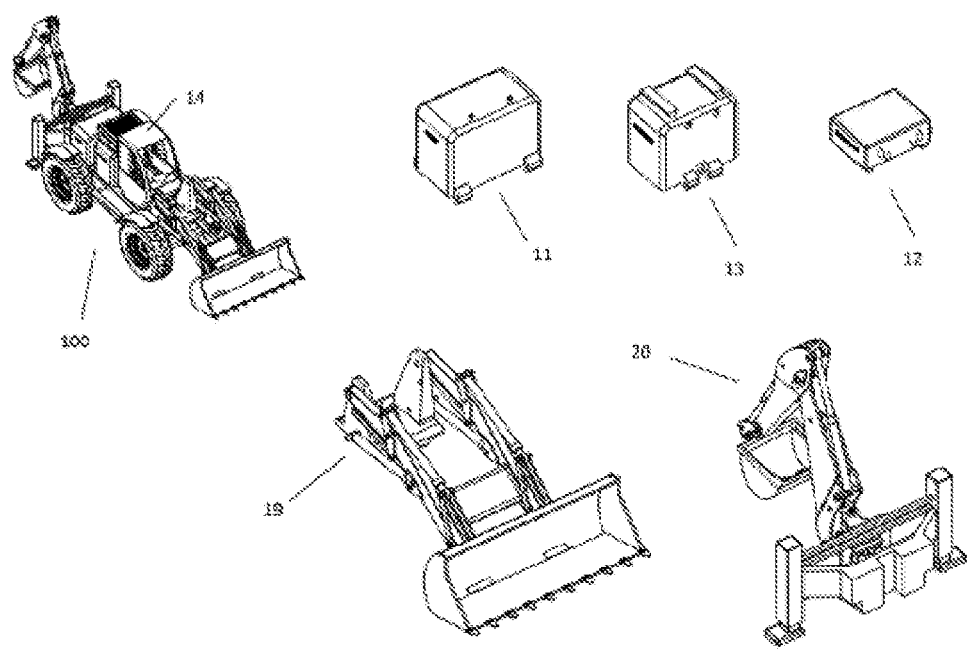
FIG. 6 is the dismantled view where the subject matter machine configuration system is applied as digger-loader.
Figure 7:
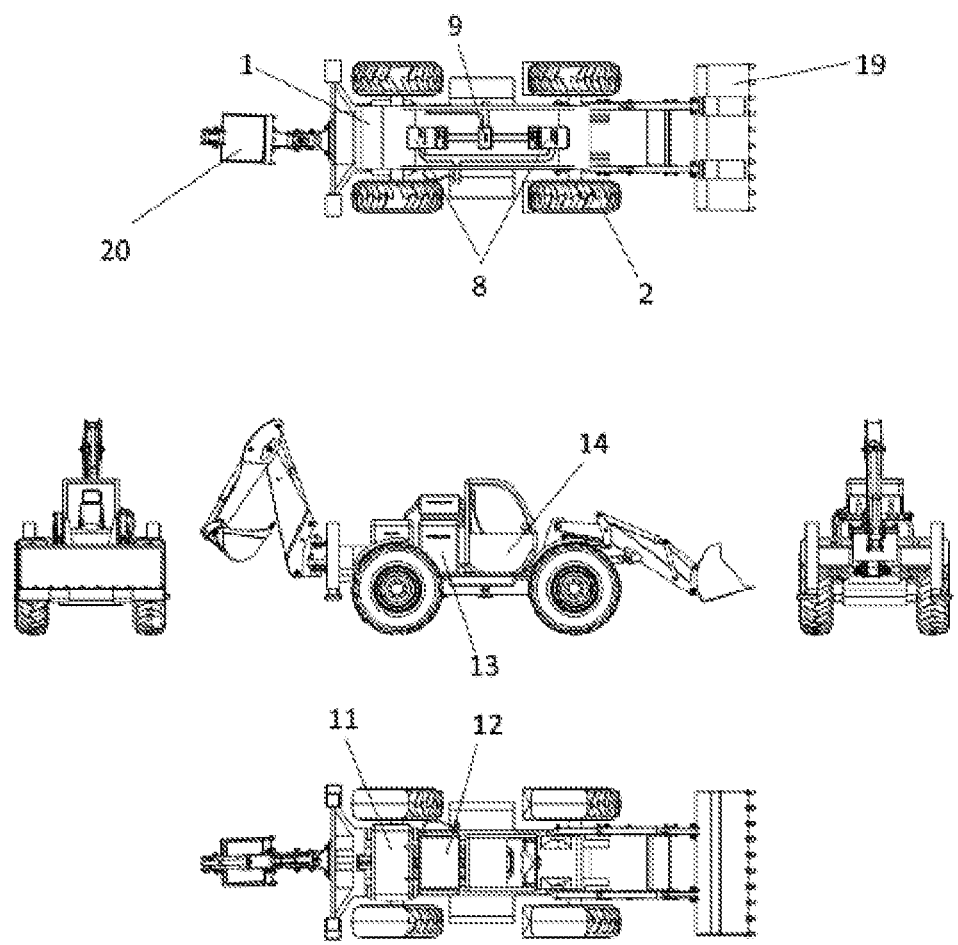
FIG. 7 is the view of the digger-loader from different perspectives.
Figure 8:
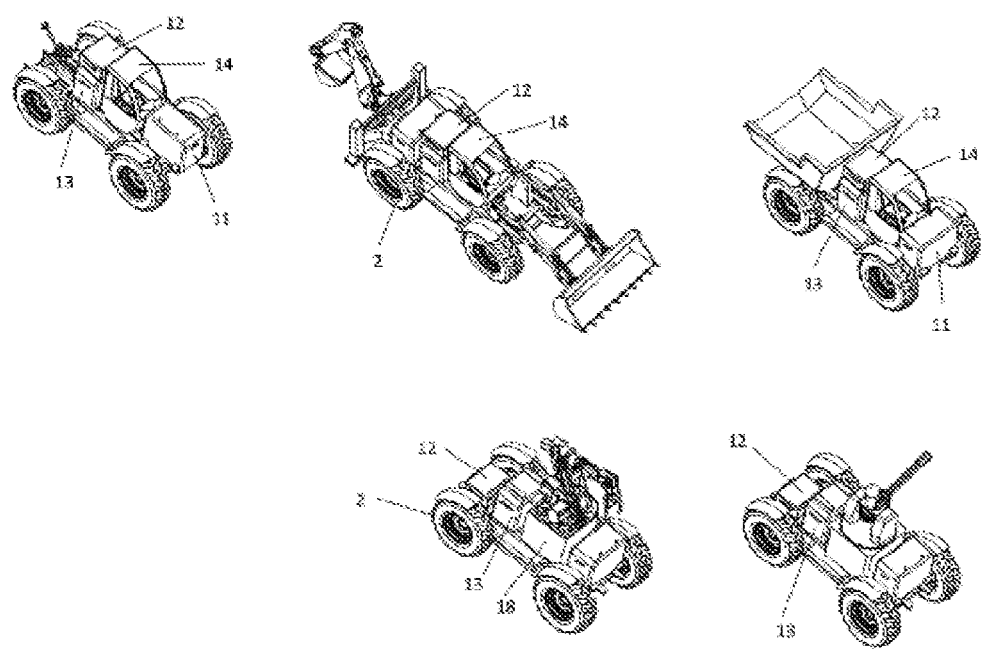
FIG. 8 is the view showing the different applications of the subject matter machine configuration system.
Figure 9:
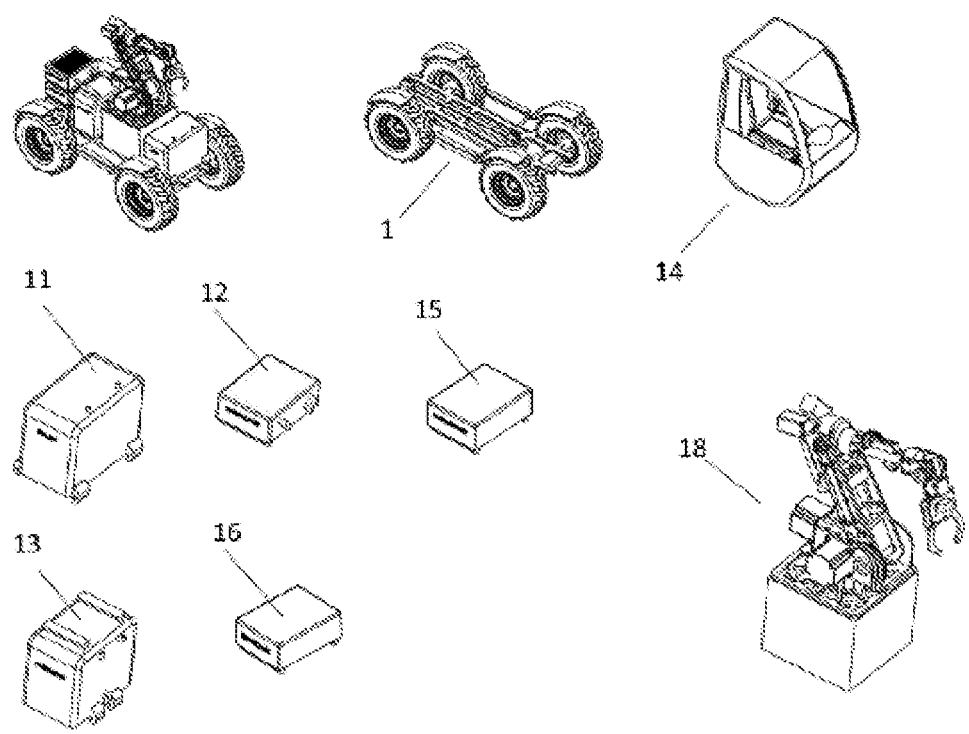
FIG. 9 is the dismantled view where the subject matter machine configuration system is applied as construction robot.
Figure 10:
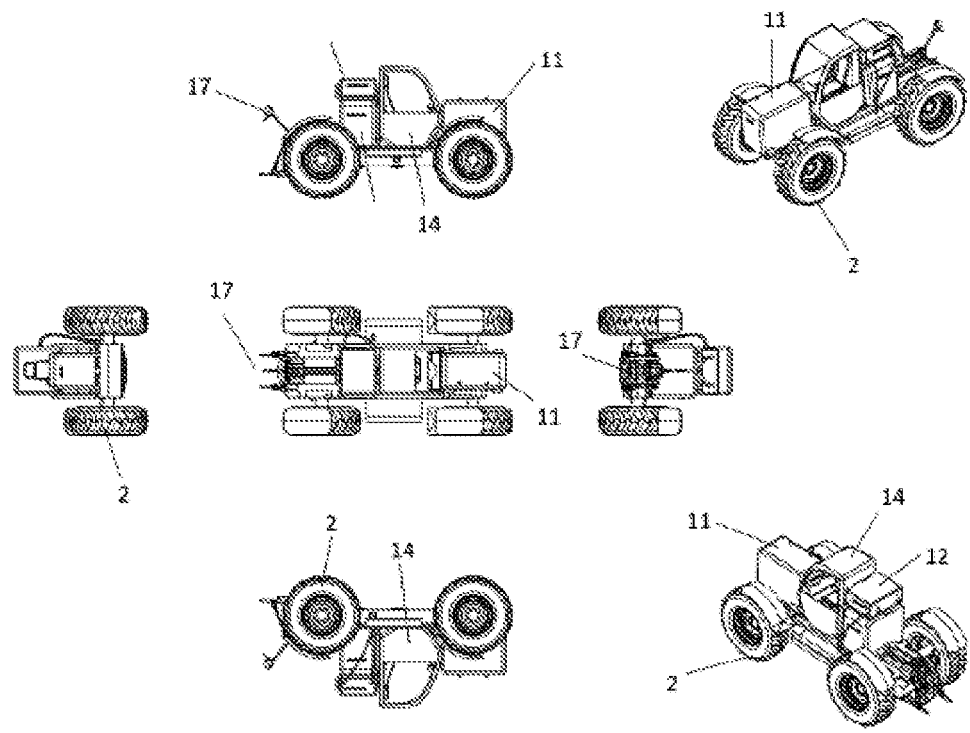
FIG. 10 is the view, where the subject matter machine configuration system is applied as agriculture tractor, from different perspectives.

In FIG. 5, the digger-loader application is illustrated. The loader (19) is the equipment used for loading process and the digger (20) is the equipment used for the digging process. The loader (19) is fixed to the front side of the main chassis (1) and the digger (20) is fixed to the rear side of the main chassis (1) and to the connection profiles (3) in the main chassis (1) by means of connection elements provided at the lower corners. The position of the earth digger attachment, which realizes the work, is changed by means of hydraulic cylinders and arm connections and the loading process is realized. The movements thereof are provided by means of controlled oil flow coming from the hydraulic module (13).

The operator cabinet (14) is placed and fixed to the rear side of the loader (19) and the hydraulic module (13) and the generator (11) are placed and fixed to the further rear side of the loader (19) in a manner forming a rear weight. The cooling module (12) is placed on the hydraulic module (13). In this case, the machine configuration system (100) is the elastic wheeled (2) loader-digger. The digger (20) is fixed to the floor thanks to the hydraulic feet thereof while digging process is being realized. The electrical cables (10) and the hydraulic quick connections (4), which provide connection to the hydraulic module (13), of the system, of which all units are placed, are realized and the cooling liquid connections (5) are fixed. Thanks to the monitor and command buttons provided in the operator cabinet (14), the control unit (9) is brought to pre-adjusted digger-loader mode. Thanks to the defining chip provided on the loader (19) and the digger (20) fixed as the equipment, the operation flow rate and pressure values of the hydraulic module (13) are automatically adjusted. Thus, the machine configuration system (100) is made ready for use as digger-loader.

The invention claimed is:
1. A machine configuration system (100) which provides formation of modular machines/tools in order to realize different works by means of various fixable/removable components and equipments; characterized by comprising:
- wheels (2) or tracks (2a) which provides movement of the machine configuration system (100) and which provides contact of the machine configuration system (100) with the floor,
- a main chassis (1) positioned on said wheels (2) or on said tracks (2a) and which accommodates connection profiles (3) which provide easy fixation of the equipments and the components to the desired location and placed horizontally and orthogonally and providing the required flexibility for a modular structure at the upper section thereof and where the modular components/equipments which provide operation of the machine configuration system (100) can be placed/fixed and removed thereon in a variable manner,
- an electric engine (8) or hydraulic engine which provides towing power to said wheel (2) or to said tracks (2a),
- a control unit (9) where all control software of the machine configuration system (100) is provided and where the mode and type of the machine/tool to be obtained at the end of the configuration are selected and where the components and equipments are controlled and where the characteristics adjustments for collaboration are realized;
- a hydraulic module (13) comprising hydraulic pump and valves and driven by the electric engine and controlled by the control unit (9) and comprising connection elements which provide fixation of the connection profiles (3) provided on the main chassis (1); and
- hydraulic quick connections (4) at a front and at a rear of the main chassis (1), the hydraulic quick connections in fluid communication with the hydraulic module (13).

2. A machine configuration system (100) according to claim 1, wherein said wheels (2) are towed through four wheels (2).

3. A machine configuration system (100) according to claim 1, wherein said wheels (2) comprise steering axles (7) connected to the electric engine (8) and which provide towing of the vehicle and determining the orientation.

4. A machine configuration system (100) according to claim 1, wherein electrical cables (10) are provided which carry power and control signals to all equipments and components.

5. A machine configuration system (100) according to claim 4, wherein cabling passage locations (6) are provided which provide entry of the electrical cables (10) of the control unit (9) and of the electric engine (8) into the main chassis (1).

6. A machine configuration system (100) according to claim 1, wherein said modular components are operator cabinet (14) where an operator sits and where the operator controls the machine configuration system (100) and comprising connection elements which provide fixation of the connection profiles (3) provided on the main chassis (1).

7. A machine configuration system (100) according to claim 1, wherein said modular components are a power unit or a generator (11) which generates power electric needed by the machine configuration system (100) and comprising connection elements which provide fixation of the connection profiles (3) provided on the main chassis (1).

8. A machine configuration system (100) according to claim 1, wherein said modular components are a battery (16) where the chargeable high-powered accumulators, where electrical energy is stored, are grouped and which is to be positioned on the main chassis (1).

9. A machine configuration system (100) according to claim 1, wherein said modular components are an ultra-capacitor (15) which are activated in case of rapid acceleration and rapid power requirement and which is to be positioned on the main chassis (1).

10. A machine configuration system (100) according to claim 1, wherein said modular components are
- a cooling module (12) positioned on the main chassis (1) which accommodates a cooling liquid radiator of the electric engine (8) and an internal combustion engine cooling radiator and oil cooling radiator groups and having an electric drive fan and which provides cooling of heated components.

11. A machine configuration system (100) according to claim 10, wherein cooling liquid connections (5) are provided which provide flow of said cooling liquid between the cooling module (12) and components/equipments.

12. A machine configuration system (100) according to claim 1, wherein said modular equipments are
- a hydraulic lifter (17) where agricultural attachments are fixed and which provides realization of work by means of towing and comprising connection elements driven by the electric engine (8) or hydraulic engine and which provides fixation to the connection profiles (3) provided on the main chassis (1).

13. A machine configuration system (100) according to claim 1, wherein said modular equipments are robot arm (18) driven by the electric engine (8) or hydraulic engine and comprising connection elements which provide fixation to the connection profiles (3) provided on the main chassis (10) and which realizes the work.

14. A machine configuration system (100) according to claim 1, wherein said modular equipments are digger (20) driven by the electric engine (8) or hydraulic engine and comprising connection elements which provide fixation to the connection profiles (3) provided on the main chassis (1) and used for digging process.

15. A machine configuration system (100) according to claim 1, wherein said modular equipments are loader (19) driven by the electric engine (8) or hydraulic engine and comprising connection elements which provide fixation to the connection profiles (3) provided on the main chassis (10 and used for loading process.

16. A machine configuration system (100) according to claim 1, wherein a control element is provided which controls the control unit (9) by means of wireless signals and which provide remote-control of the system.

17. A machine configuration system (100) according to claim 1, wherein cooling liquid connections (5) are provided which provide flow of said cooling liquid between the cooling module (12) and components/equipments.

18. A machine configuration system (100) which provides formation of modular machines/tools in order to realize different works by means of various fixable/removable components and equipments; characterized by comprising:
- wheels (2) or tracks (2a) which provides movement of the machine configuration system (100) and which provides contact of the machine configuration system (100) with the floor,
- a main chassis (1) positioned on said wheels (2) or on said tracks (2a) and which accommodates connection profiles (3) which provide easy fixation of the equipments and the components to the desired location and placed horizontally and orthogonally and providing the required flexibility for a modular structure at the upper section thereof and where the modular components/equipments which provide operation of the machine configuration system (100) can be placed/fixed and removed thereon in a variable manner, an electric engine (8) or hydraulic engine which provides towing power to said wheel (2) or to said tracks (2a), a control unit (9) where all control software of the machine configuration system (100) is provided and where the mode and type of the machine/tool to be obtained at the end of the configuration are selected and where the components and equipments are controlled and where the characteristics adjustments for collaboration are realized; and a cooling module (12) positioned on the main chassis which comprises a cooling liquid radiator of the electric engine (8), an internal combustion engine cooling radiator and oil cooling radiator groups and having an electrically driven fan.

19. A machine configuration system (100) according to claim 18, wherein said modular components are a hydraulic module (13) which provides movement to the equipments and to the attachments and comprising hydraulic pump and valves and driven by the electric engine and controlled by the control unit (9) and comprising connection elements which provide fixation of the connection profiles (3) provided on the main chassis (1).

20. A machine configuration system (100) according to claim 19, wherein hydraulic quick connections (4) are provided which are placed at the front and at the rear of the main chassis (1) and connected to each other by means of pipes and which provides transmission of the hydraulic fluid, exiting the hydraulic module (13), to the components and equipments, provided at the front and rear section, in a practical and simple manner for hydraulic power transmission.

21. A machine configuration system (100) which provides formation of modular machines/tools in order to realize different works by means of various fixable/removable components and equipments; characterized by comprising:

wheels (2) or tracks (2a) which provides movement of the machine configuration system (100) and which provides contact of the machine configuration system (100) with the floor, a main chassis (1) positioned on said wheels (2) or on said tracks (2a) and which accommodates connection profiles (3) which provide easy fixation of the equipments and the components to the desired location and placed horizontally and orthogonally and providing the required flexibility for a modular structure at the upper section thereof and where the modular components/equipments which provide operation of the machine configuration system (100) can be placed/fixed and removed thereon in a variable manner, an electric engine (8) or hydraulic engine which provides towing power to said wheel (2) or to said tracks (2a), a control unit (9) where all control software of the machine configuration system (100) is provided and where the mode and type of the machine/tool to be obtained at the end of the configuration are selected and where the components and equipments are controlled and where the characteristics adjustments for collaboration are realized;

a hydraulic module (13) comprising hydraulic pump and valves and driven by the electric engine and controlled by the control unit (9) and comprising connection elements which provide fixation of the connection profiles (3) provided on the main chassis (1);

hydraulic quick connections (4) at a front and at a rear of the main chassis (1), the hydraulic quick connections in fluid communication with the hydraulic module (13); and a cooling module (12) positioned on the main chassis which comprises a cooling liquid radiator of the electric engine (8), an internal combustion engine cooling radiator and oil cooling radiator groups and having an electrically driven fan;

wherein cooling liquid connections (5) are provided which provide flow of said cooling liquid between the cooling module (12) and components/equipments.

\* \* \* \* \*